US 7,684,833 B2

(12) United States Patent
Marschalkowski et al.

(10) Patent No.: US 7,684,833 B2
(45) Date of Patent: Mar. 23, 2010

(54) MICRO-CONTROLLER CONTROLLED POWER MANAGEMENT CHIP

(75) Inventors: Eric Marschalkowski, Inning (DE); Manfred Plankensteiner, Germering (DE)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 0 days.

(21) Appl. No.: 10/846,414

(22) Filed: May 14, 2004

(65) Prior Publication Data
US 2005/0250557 A1 Nov. 10, 2005

(30) Foreign Application Priority Data
May 10, 2004 (EP) .................................. 04368038

(51) Int. Cl.
*H04B 1/38* (2006.01)
(52) U.S. Cl. ................. 455/574; 455/550.1; 455/343.5; 455/127.1; 455/575.1; 713/320; 713/322; 307/86
(58) Field of Classification Search ......... 455/572–574, 455/343.1–4, 343.6, 343.5, 550.1, 127.1, 455/575.1, 90.3; 320/127, 114; 713/320, 713/322; 307/66, 86
See application file for complete search history.

(56) References Cited

U.S. PATENT DOCUMENTS

| 5,182,810 | A | * | 1/1993 | Bartling et al. ............. 713/323 |
| 5,390,350 | A |   | 2/1995 | Chung et al. ................ 395/150 |
| 5,438,696 | A | * | 8/1995 | Napoles .................... 455/343.6 |
| 5,638,540 | A | * | 6/1997 | Aldous ....................... 713/300 |
| 5,675,814 | A | * | 10/1997 | Pearce ......................... 713/324 |
| 5,732,281 | A |   | 3/1998 | Summers et al. ............. 395/828 |
| 5,832,286 | A | * | 11/1998 | Yoshida ...................... 713/324 |
| 5,834,857 | A | * | 11/1998 | Abe et al. ...................... 307/66 |
| 5,870,613 | A | * | 2/1999 | White et al. ................. 713/300 |
| 5,872,983 | A | * | 2/1999 | Walsh et al. ................. 713/300 |
| 5,905,900 | A | * | 5/1999 | Combs et al. ............... 713/320 |
| 5,926,404 | A | * | 7/1999 | Zeller et al. ................. 713/321 |
| 5,958,054 | A | * | 9/1999 | O'Connor et al. ........... 713/300 |
| 5,958,055 | A | * | 9/1999 | Evoy et al. ................... 713/310 |
| 6,246,890 | B1 | * | 6/2001 | Sato et al. .................... 455/573 |
| 6,348,744 | B1 | * | 2/2002 | Levesque ...................... 307/86 |
| 6,367,022 | B1 | * | 4/2002 | Gillespie et al. ............. 713/300 |
| 6,393,573 | B1 | * | 5/2002 | Gillespie et al. ............. 713/324 |
| 6,600,298 | B2 | * | 7/2003 | McDonald et al. .......... 323/271 |

(Continued)

FOREIGN PATENT DOCUMENTS

| EP | 0666527 A1 | 1/1995 |
| EP | 1403754 A2 | 9/2003 |

*Primary Examiner*—Sharad Rampuria
(74) *Attorney, Agent, or Firm*—Saile Ackerman LLC; Stephen B. Ackerman

(57) ABSTRACT

Novel power-management chips (PMCS) and a related method to increase the flexibility of power-management chips and to disburden a main controller of mobile electronic devices, such as e.g. a mobile phone, have been achieved. Key of the invention is to implement a microprocessor system on a power-management chip. This microprocessor, having a flash-memory and a RAM has either no or minimum interaction with a main controller of the mobile electronic device since the microprocessor on the PMC is controlling all power supply requirements of the mobile electronic device. The novel PMC is more flexible; since it is free programmable and customers can adapt their PMC more efficiently to the specific purposes of their application.

24 Claims, 2 Drawing Sheets

U.S. PATENT DOCUMENTS

| | | | |
|---|---|---|---|
| 6,704,561 B2 * | 3/2004 | Kuroiwa | 455/343.1 |
| 6,931,555 B2 * | 8/2005 | Osborn | 713/320 |
| 6,965,763 B2 * | 11/2005 | Bussan et al. | 455/343.4 |
| 6,988,214 B1 * | 1/2006 | Verdun | 713/320 |
| 7,162,279 B2 * | 1/2007 | Gupta | 455/574 |
| 7,178,045 B2 * | 2/2007 | Puffer et al. | 713/300 |
| 7,251,509 B1 * | 7/2007 | Wang et al. | 455/574 |
| 7,281,144 B2 * | 10/2007 | Banginwar et al. | 713/320 |
| 7,305,569 B2 * | 12/2007 | Reilly | 713/300 |
| 7,366,549 B2 * | 4/2008 | Lee et al. | 455/574 |
| 7,395,440 B2 * | 7/2008 | Nokkonen | 713/300 |
| 7,493,149 B1 * | 2/2009 | Doyle et al. | 455/574 |
| 7,502,817 B2 * | 3/2009 | Ryan | 709/200 |
| 2002/1003989 * | 4/2002 | Loke et al. | 455/127 |
| 2003/0085622 A1 * | 5/2003 | Hailey | 307/52 |
| 2004/0029620 A1 * | 2/2004 | Karaoguz | 455/574 |
| 2004/0029621 A1 * | 2/2004 | Karaoguz et al. | 455/574 |
| 2004/0039969 A1 | 2/2004 | Pratt et al. | 714/42 |
| 2004/0067771 A1 | 4/2004 | Wieck | 455/558 |
| 2004/0142726 A1 * | 7/2004 | Dayan et al. | 455/557 |
| 2005/0143146 A1 * | 6/2005 | Kim | 455/574 |
| 2005/0245292 A1 * | 11/2005 | Bennett et al. | 455/574 |

* cited by examiner

MICRO-CONTROLLER CONTROLLED POWER MANAGEMENT CHIP

BACKGROUND OF THE INVENTION (1) Field of the Invention

This invention relates generally to power management of mobile applications as e.g. mobile phones and relates more particularly to a power management chip having a micro-controller included.

(2) Description of the Prior Art

Electronic mobile devices have increased their functionality dramatically in the past years and this process continues. Adding new functions increases the requirements of the control of the total mobile system and of power management. Examples for these power management requirements are to support multiple charging sources, multiple supply voltages within the product, demands for optimum efficiency, and very limited space complicates power management.

These factors have driven the development of highly integrated power-management chips (PMCs) for cell phones, video cameras, digital still cameras, PDAs, MP3 players, GPS receivers, etc.

Power management chips (PMC) integrate most or all of the functions required for managing battery power, charger control, and voltage conversion in digital cellular handsets and other battery powered mobile applications where power and performance requirements are similar.

Current practice for mobile applications is to have a main micro-controller in the base-band chip set and one or more PMCs, wherein the micro-controller in the base-band is controlling all functions of the mobile system including the power management functions of the PMCs. Within the PMC a small hard-wired state-machine controls the internal functions.

There are patents and patent applications available on the matter of power management of mobile devices.

U.S. Pat. No. (5,182,810 to Bartling et al.) describes a battery-backed ancillary power-management chip, in combination with a battery-backed microprocessor or microcontroller, permits a low-power system to achieve a zero-power standby mode with full nonvolatility. The ancillary chip contains transmission gates, which can cut off the connection between two other chips if one of them is turned off. This avoids problems of power leakage, substrate pumping, etc., when two chips, which are connected together, can be independently powered up or powered down. Also provided is a portable data module, which includes a microprocessor and a large LCD display. The disclosed inventions permit the user to operate the display without powering up the microprocessor (to preserve a complex display, e.g. when the user has provided no inputs for a certain length of time), or to operate the microprocessor without the display (e.g. for data transfer or reduction operations).

U.S. Patent Application (2003/0085622 to Hailey) discloses a method and an apparatus for sharing a load current among a plurality of power supply systems. For each of the plurality of power supply systems an output current and at least one variable representing an operational stress factor associated with the power supply system is measured. The current output of at least one of the plurality of power supplies is adjusted as a function of the at least one measured variable that represents the operational stress factor. The apparatus for sharing a load current among a redundant power supply system includes a first power supply system coupled to a second power supply system. The apparatus also includes a balance circuit configured to receive two inputs. A first input represents a current output of the second power supply system and a second input represents the at least one measured variable associated with the first power supply system. The balance circuit is operable to provide feedback to the first power supply system in response to the received inputs. A computer system includes a power supply, which includes various types of power supplies for converting power from AC-to-DC and/or DC-to-DC. The power supplies may be housed within the computer system enclosure or may be housed external to the computer system enclosure. The computer system also includes a power management chip set. The power management chip set is coupled to a processor via a local bus 620 so that the power management chip set can receive power control commands from processor.

U.S. Patent Application (2004/0039969 to Pratt et al.) describes a method, system and apparatus for testing a removable storage media drive device. According to teachings of the present disclosure, a simulated storage media may be disposed within a removable storage media drive device. In the event removable storage media is not present in the drive device when testing of the device is desired, the simulated storage media may be substituted for at least purposes of testing the operability of one or more device components. In one embodiment, the simulated storage media may be in the form of an annular ring of CD-ROM material. In a further embodiment, the simulated storage media may be in the form of a hologram designed to mimic one or more removable storage media characteristics. An information handling system preferably also includes a power management chip set. The power management chip set is preferably coupled to a CPU via a local bus so that the power management chip set can receive power control commands from the CPU. The power management chip set may also be connected to a plurality of individual power planes.

SUMMARY OF THE INVENTION

A principal objective of the present invention is to achieve a power-management chip of a mobile electronic device having an increased flexibility.

A further objective of the present invention is to achieve a power-management chip, which can disburden load from a main controller of a mobile electronic device.

In accordance with the objects of this invention a system, used as a power-management chip to manage the power supply of mobile electronic devices, wherein all components are integrated on one chip has been achieved. Said system is comprising a micro-controller, a means of memory to store the program of said micro-controller, a means of memory to store data processed by said micro-controller, a means to control the start-up and shut-down of said system, a bus system connecting all components of the system, a number of input and output ports, means to control charging and voltage of the battery, and means of power supply.

In accordance with the objects of this invention a method to increase the flexibility of a power-management chip and to disburden a main controller of a mobile electronic device has been achieved. Said method comprises, firstly, (1) to provide a power management chip and a microprocessor having a flash-memory, a RAM, and a bus system. Further steps of the method are (2) to implement a micro-processor on the power-management chip, (3) to load control program of said microprocessor into flash-memory, (4) to check if modified requirements in regard of power management exist and go to wait if there are no modified requirements, and (5) in case there are modified requirements, to modify control program and go back to step (3).

BRIEF DESCRIPTION OF THE DRAWINGS

In the accompanying drawings forming a material part of this description, there is shown.

DESCRIPTION OF THE PREFERRED EMBODIMENTS

The preferred embodiments disclose novel power-management chips (PMCs) and related method, wherein the PMCs of the present invention are characterized by having a micro-controller with internal flash memory and RAM embedded as integrated part of the PMC.

The advantage of the PMCs invented is that the integrated micro-controller on one side relieves the base-band micro-controller from the task of power management, setting free resources of the base-band micro-controller to support other functions, and on the other side it enables the PMC to be more flexible since it is free programmable and customers, who are designers and/or producers of mobile electronic devices, are able to adapt the PMC more efficient to the purposes of the application.

Using the PMC of the present invention all power management functions are programmable by the internal microprocessor of the PMC. In prior art all the power management support features like battery charger, LED drivers, etc. were already implemented and hard wired. Therefore a customer, buying a PMC chip in order to put it into an electronic mobile device, had to know the power management requirements of his electronic mobile device very early in the design phase. In prior art it is not possible to adjust the PMC at a later point of time for other applications, other features of mobile devices, other base-band micro-controllers, etc.

A key of the invention is the flexibility of the new PMC. Having a micro-processor with a internal program flash memory integrated into a PMC all power management functions can be adjusted to changing requirements during the development of mobile electronic devices.

Figure 1:
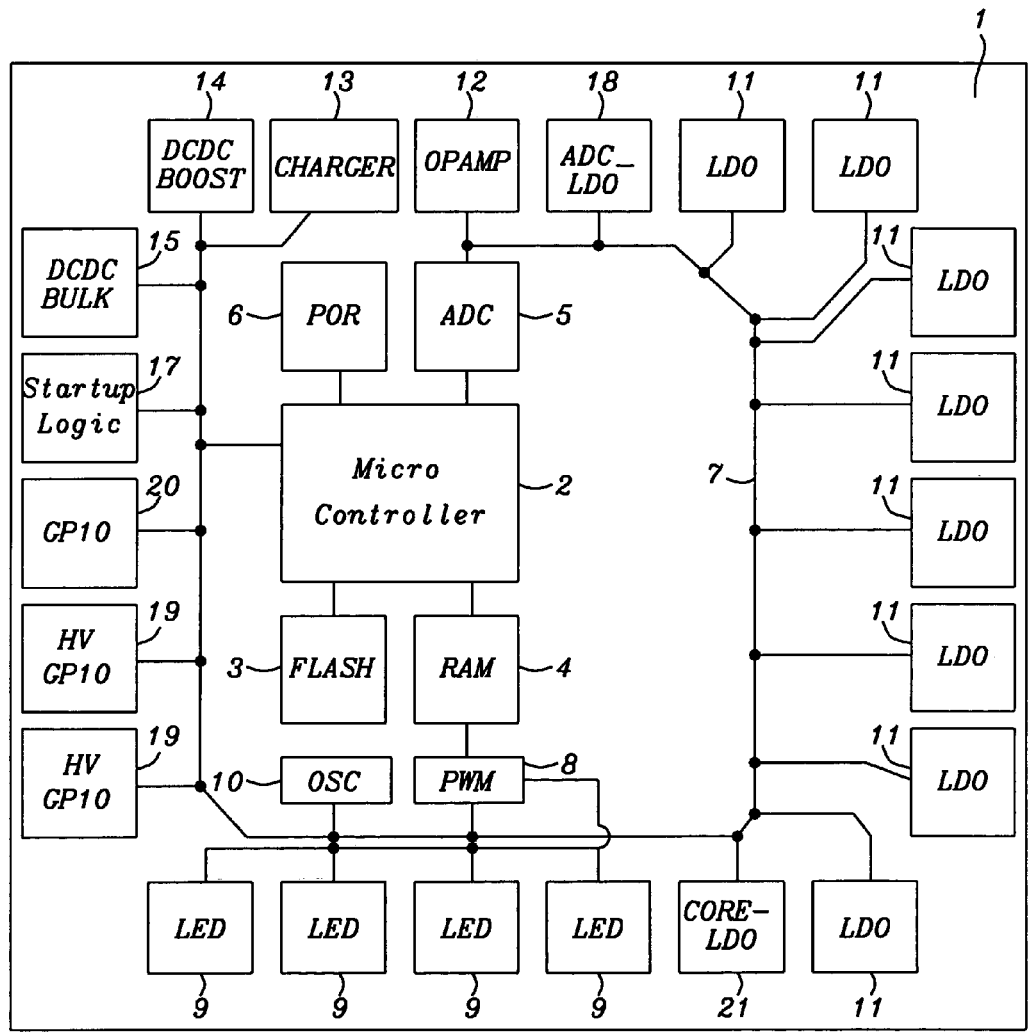
FIG. 1 shows an overview of the power-management chip invented.

FIG. 1 shows a preferred embodiment of the present invention. It shows as example a power-management chip designed for a mobile phone. It has to be understood that this is an example only of the invention. Other PMCs for different mobile electronic devices will certainly differ in regard of the kind and number of power management devices as voltage converters, battery chargers, etc. The architecture of the invented PMCs, having a microcontroller, a RAM, a flash memory, and a bus will be common for all different applications.

FIG. 1 shows a PMC 1 of the present invention. It comprises a micro-controller 2, which is in this preferred embodiment an 8051 micro-controller. The memory provided comprises a flash-memory 3 and a RAM 4 being connected to the micro-controller 2. In a preferred embodiment the RAM used has 128 bytes and the flash memory used has 2.5 Kbytes. A bus 7 connects the different sub-blocks of the PMC 1 invented to the micro-controller 2.

A power management control logic is provided in order to control the start-up and shutdown of the PMC 1. It comprises the power-on-reset (POR) generator unit 6, a charger detection, a band-gap reference voltage, the start-up logic 17, a power ON/OFF key scanning circuit, a temperature supervision, a battery supply supervision and a clock oscillator 10. In order to guarantee the correct start-up of the PMC 1, a power-on-reset (POR) is generated for the first connection of either the charger 13 supply voltage or the battery supply voltage.

In this preferred embodiment, a band-gap reference (BGR) based POR signal is used, which means the POR signal is distributed only if the band-gap has started up correctly. BGR is an internal reference voltage. The micro-controller 2 can only start if this reference voltage is up.

The initial setup of the micro-controller and low drop-out (LDO) voltage converters 11 are initiated by the start-up logic 17. This is a small state-machine that, after the POR signal has started the oscillator 10, allows the micro-controller 2 taking over system control.

In order to guarantee a correct start-up of the PMC, a power-on-reset (POR) signal is generated for the first connection of either the charger supply or the battery supply voltage. The main band-gap reference circuit is enabled when the POR signal is released and when either the charger 13 or the battery supply is detected.

The PMC can be switched on from power down mode (Power Key is OFF) into active mode by the signals POR or the signal PHONE_ON. Each of the signals will start the band-gap reference and the CORE_LDO 21. As soon as the CORE_LDO 21 is up, micro-controller 2 will receive a POR_µC signal and will start up with its standard startup routine and will take over system control.

In order to protect the PMC from damage due to power dissipation, an internal temperature measurement will be done every 1 ms. Only after three consecutive temperature measurements indicate a thermal overload an OVERTEMP fault condition will be generated. In case an OVERTEMP signal is detected the PMC will power-down and record the fault in the fault status register in the flash memory 3.

The battery supply supervision is a sub-system of the charger control block 13. In case of over-voltage the PMC 1 will switch OFF charging record the fault in the fault status register of the flash memory 3 and will power down.

The PMC has three modes of operation. A first mode of operation is the "Power Down Mode" which is characterized by a minimum current consumption; all power regulators are powered down. A second mode of operation is the "Sleep Mode", which is characterized by a minimized current consumption. A difference compared to the "Power Down Mode" is that in the "Sleep Mode" the power regulators are ON having minimum load only. A third mode of operation is the "Active Mode" wherein all power regulators are ON having a load according to the functions active. All these three modes of operation are controlled by the micro-controller 2.

The battery charger module 13 controls the charging of the battery and allows a start-up independent of the voltage of the battery. All charge modes are controlled directly by the micro-controller 2. The battery charger 13 module comprises a charger insertion and removal detection working with two comparators. A voltage comparator senses the absolute charger voltage greater than a first reference voltage, a differential comparator senses during charging the charger voltage to be +50 mV greater than a second reference voltage. The PMC supports multiple charge modes, first, a linear charge mode, having two operation modes, a constant current mode and a constant voltage mode. A second charge mode is a fast-pulse charge mode.

In regard of power supply the preferred embodiment shown in FIG. 1 comprises nine low drop-out (LDO) voltage regulators 11, one direct current (DC)-to-DC buck converter 15, one DC-to-DC boost converter 14, and one ADC-LDO 18. Said ADC_LDO supplies the voltage for the analog-to-digital converter 5.

Furthermore the PMC comprises an operational amplifier 12 to measure the charger voltage, the charger current, the battery voltage and the battery current. The operational amplifier 12 is used to amplify the voltage drop across an external shunt resistor that is used to measure the battery charge current. In combination with the high-resolution analog-to-digital converter 5 fuel gauging can be performed. This operational amplifier 12 transforms the signals to be measured into a range that the analog-to-digital converter 5 is able to measure with high precision.

The preferred embodiment of the PMC described in FIG. 1 also provides two high-voltage (HV) general purpose I/Os (GPIO) 19 which can withstand 20V, and eight 5V GPIOs 20, and a pulse-width modulator (PWM) driver 8, which is connected to the random access memory (RAM) 8, to the bus 7 and to a group in parallel-connected light-emitting diodes (LED) driver current sources 9.

Figure 2:
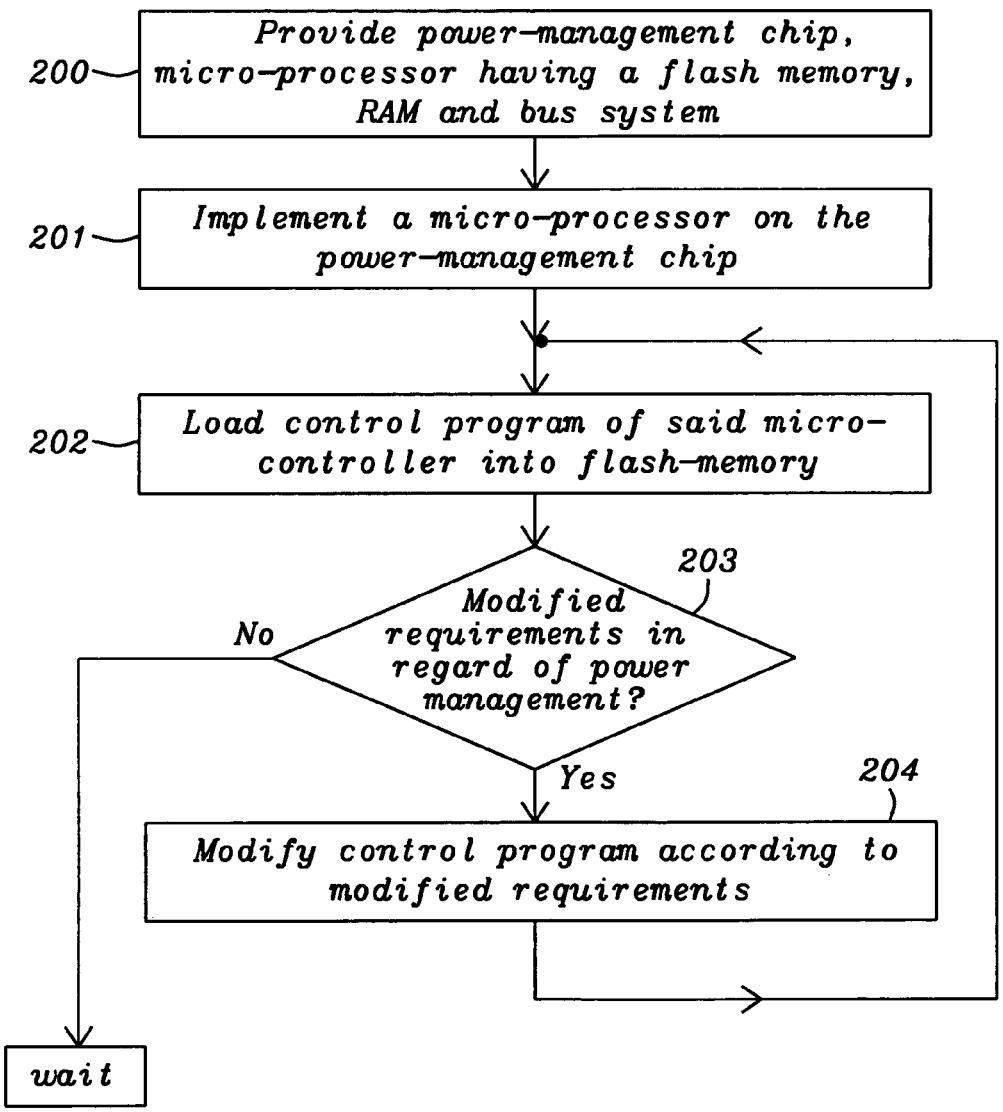
FIG. 2 describes a flowchart of a method to increase the flexibility of a power-management chip

It has to be understood that PMC shown in FIG. 1 is just one example of the present invention. Depending upon the requirements of mobile electronic system the requirements of power management can differ significantly and this will change the type and number of sub-blocks of the PMCs, especially in regard of the power supply units as e.g. LDOs, boost converters, buck converters, but also in the area of GPIOs and LED driver current supply FIG. 2 shows a flowchart of a method to increase the flexibility of power-management chips and to disburden a main processor of a mobile electronic device. The first step 200 describes the provision of a power-management chip, a microprocessor having a flash-memory, a RAM, and a bus system. The next step 201 comprises the implementation of a microprocessor on the power-management chip. In the following step 202 a control program for said microprocessor is loaded into the flash memory. The next step 203 checks if there are modified requirements in regard to power management. In case there are no modified requirements the process gets into a wait status until potentially a modification will be required at a later point of time. In case there are modified requirements the control program is modified in step 204 and the process flow goes back to step 202.

While the invention has been particularly shown and described with reference to the preferred embodiments thereof, it will be understood by those skilled in the art that various changes in form and details may be made without departing from the spirit and scope of the invention.

What is claimed is:

1. A system, used as a power-management chip to solely manage the power supply of mobile electronic devices, wherein all components are integrated on one chip, is comprising:
    a micro-controller, performing exclusively power management;
    a means of memory to store the program of said micro-controller;
    a means of memory to store data processed by said micro-controller;
    a means to control the start-up and shut-down of said system;
    a bus system connecting all components of the system;
    a number of input and output ports;
    means to control charging and voltage of the battery; and
    means of direct current (DC)-to-DC conversion.

2. The system of claim 1 wherein said micro-controller is an 8051 micro-controller.

3. The system of claim 1 wherein said mobile electronic device is a mobile phone.

4. The system of claim 1 wherein said means of memory to store the program is a flash-memory.

5. The system of claim 4 wherein said flash-memory has 2.5 Kbytes.

6. The system of claim 1 wherein said means of memory to data processed by said microprocessor is a random access memory (RAM).

7. The system of claim 6 wherein said RAM has 128 bytes.

8. The system of claim 1 wherein said means to control start-up and shut-down is comprising:
    a power-on reset generator;
    a band-gap reference;
    a start-up logic;
    a power key scanning;
    a battery temperature supervision;
    a battery supply supervision; and
    a means to provide clock pulses.

9. The system of claim 8 wherein said means to provide clock pulses is an oscillator.

10. The system of claim 8 wherein said start-up logic is a state-machine.

11. The system of claim 1 wherein said means to control charging and voltage of the battery comprises a charger insertion and removal detection.

12. The system of claim 11 wherein said charger insertion and removal detection works with two comparators.

13. The system of claim 1 wherein said means to control charging and voltage of the battery comprises two charge modes, a linear charge mode and a fast-pulse charge mode.

14. The system of claim 1 wherein said system comprises eight general-purpose input/output ports and two 20 V general-purpose input/output ports.

15. The system of claim 1 wherein said means of power supply comprises at least one low drop-out (LDO) voltage converter.

16. The system of claim 1 wherein said means of DC-to-DC conversion comprises at least one boost voltage converter.

17. The system of claim 1 wherein said means of DC-to-DC conversion comprises at least one buck voltage converter.

18. The system of claim 1 wherein said means of power supply comprises at least one current source for light emitting diodes (LEDs).

19. A method to increase the flexibility of a power-management chip, which is solely managing the power of a mobile device, and to disburden a main controller of a mobile electronic device is comprising:
    (1) provide a power management chip comprising means for DC-to-DC conversion, a microprocessor, performing exclusively power management, having a flash-memory, a RAM, and a bus system, wherein all components required for power-management are integrated on one chip;
    (2) implement a microprocessor on the power-management chip;
    (3) load control program of said microprocessor into flash-memory;
    (4) check if modified requirements in regard of power management exist and go to wait if there are no modified requirements; and
    (5) in case there are modified requirements, modify control program and go back to step (3).

20. The method of claim 19 wherein said microprocessor is an 8051 micro-controller.

21. The method of claim 19 wherein said flash-memory has 2.5 Kbytes.

22. The system of claim 1 wherein said micro-controller is controlling all power supply requirements of said mobile electronic device.

23. The method of claim 19 wherein said micro-controller is controlling all power supply requirements of said mobile electronic device.

24. The system of claim 1 wherein said means of DC-to-DC conversion comprises at least one low drop-out voltage regulator.

* * * * *